(12) United States Patent
Hirafuji et al.

(10) Patent No.: US 7,748,164 B2
(45) Date of Patent: Jul. 6, 2010

(54) MICRO GRAVITY ENVIRONMENTAL CONTROL APPARATUS AND MICRO GRAVITY ENVIRONMENTAL CONTROL METHOD

(75) Inventors: Masayuki Hirafuji, Ibaraki (JP); Tokihiro Fukatsu, Ibaraki (JP); Kei Tanaka, Ibaraki (JP); Keiko Ibaraki, Iwate (JP)

(73) Assignees: Incorporated Administrative Agency National Agriculture and Bio-oriented Research Organization (JP); National Space Development Agency of Japan (JP); Japan Space Forum (JP)

( * ) Notice: Subject to any disclaimer, the term of this patent is extended or adjusted under 35 U.S.C. 154(b) by 1104 days.

(21) Appl. No.: 10/423,674

(22) Filed: Apr. 24, 2003

(65) Prior Publication Data
US 2004/0020115 A1     Feb. 5, 2004

(30) Foreign Application Priority Data
Jul. 30, 2002     (JP)     ............... 2002-220653

(51) Int. Cl.
*A01G 31/00*     (2006.01)
(52) U.S. Cl. .......................... 47/60; 47/62 A
(58) Field of Classification Search ........... 47/62 A, 47/59 R, 60, 62 R, 62 N; 119/418, 419; 435/289.1, 435/292.1
See application file for complete search history.

(56) References Cited

U.S. PATENT DOCUMENTS

| | | | | |
|---|---|---|---|---|
| 3,067,543 | A | * 12/1962 | Bracey | ............... 47/80 |
| 4,754,571 | A | * 7/1988 | Riechmann | ............... 47/59 R |
| 5,937,575 | A | * 8/1999 | Zobel et al. | ............... 47/62 A |
| 6,006,471 | A | * 12/1999 | Sun | ............... 47/69 |
| 6,230,437 | B1 | * 5/2001 | Wolverton et al. | ............... 47/39 |
| 6,898,616 | B2 | 5/2005 | Hirafuji | |

FOREIGN PATENT DOCUMENTS

| | | | |
|---|---|---|---|
| EP | 300536 A1 | * | 1/1989 |
| JP | 2003-072817 | | 3/1991 |

(Continued)

OTHER PUBLICATIONS

Brown et al. 1992. The vacuum-operated nutrient delivery system: Hydroponics for microgravity. HortScience 27(11): 1183-1185.*

*Primary Examiner*—Peter M Poon
(74) *Attorney, Agent, or Firm*—Curtis L. Harrington; Kathy E. Harrington; Harrington & Harrington

(57) ABSTRACT

The present invention provides a micro gravity environmental control apparatus, such as a plant cultivating apparatus, an animal raising apparatus, and a micro gravity environmental control method, such as a plant cultivating method, an animal raising method, a breeding method, capable of cultivating a plant and raising an animal by using soil and also capable of recovering moisture supplied to the soil so as to reuse the moisture, under a weightless environment or a micro gravity environment. There is provided a micro gravity environmental control apparatus comprising a chamber, an air suction pipe arranged in the vicinity of a lower end portion within the chamber, and an air sucking part communicated and connected with the air suction pipe and used for sucking air within the chamber out of the chamber.

8 Claims, 5 Drawing Sheets

FOREIGN PATENT DOCUMENTS

| | | |
|---|---|---|
| JP | 2000-009224 | 1/2000 |
| JP | 2000004696 A * | 1/2000 |
| JP | 2001-188923 | 7/2001 |
| JP | 2002-218968 | 8/2002 |
| JP | 2002-220653 | 8/2002 |
| JP | 2003-098287 | 4/2003 |
| JP | 2003-425470 | 7/2003 |
| JP | 2003-425471 | 7/2003 |
| JP | 2003-293890 | 10/2003 |
| JP | 2003-326132 | 11/2003 |
| JP | 2004-064005 | 2/2004 |

* cited by examiner

MICRO GRAVITY ENVIRONMENTAL CONTROL APPARATUS AND MICRO GRAVITY ENVIRONMENTAL CONTROL METHOD

BACKGROUND OF THE INVENTION

1. Field of the Invention

The present invention relates to a micro gravity environmental control apparatus and micro gravity environmental control method, such as a plant cultivating apparatus, an animal raising apparatus, and a plant cultivating method, an animal raising method, a breeding method. An object of the present invention is to provide a micro gravity environmental control apparatus, such as a plant cultivating apparatus, an animal raising apparatus, and a micro gravity environmental control method, such as a plant cultivating method, an animal raising method, a breeding method, capable of cultivating a plant and raising an animal by using soil and also capable of recovering moisture supplied to the soil so as to reuse the moisture, under a weightless environment or a micro gravity environment.

2. Description of the Related Art

At present, an international space station has been constructed, and a commercial space travel has been planned. Conventionally, a mission in the space environment is a mission for a short term by a small number of persons; however, it is considered that a mission for a long term by a lot of persons will be actively performed. As crews stay in the space for a long term, and as a number of crews simultaneously stay in the space, it becomes an important problem to reserve food stuffs. Of course, the food stuffs to be required may be set off from the earth; however, an enormous cost is generated for setting off a large number of food. Accordingly, it is apparent that necessity of self-supply of the food stuffs is generated.

It is also a great problem in the space stay to treat body wastes of the crews and experimental animals. In the case of treating the body wastes in accordance with a chemical method, a great cost is required for setting off an apparatus for the chemical method and maintaining the apparatus. On the other hand, in the case of treating the body wastes in accordance with a microbiological organic matter decomposition which is carried out in the soil or an inner portion of an activated sludge tank, there is an advantage that an organic matter such as a compost or the like obtained in the treating process can be reused for cultivating the plant. However, in using the soil and the liquid in the space, it is necessary to take all possible measures so as to prevent the soil and the liquid from flying in all directions and being flown out. Taking an apparatus required for the measure and a cost for setting off into consideration, this method is under a condition that the method can not be used at present.

Further, it has been known that there is a case where a living thing expresses a feature which has not been found, under the weightless environment and the micro gravity environment. Accordingly, it is considered that a product class improvement of the living thing or a search of new genetic factor gets into full swing in the future by utilizing the micro gravity environment such as the space environment. In the case where the breeding of the living thing utilized in the earth is carried out in the space environment, it is desirable to breed the living thing under the same environmental condition as the environmental condition on the earth except the gravity, that is, a cultivating condition using the soil composed of a lot of living things such as a soil product material or the like.

In the micro gravity environment or the weightless environment such as a space ship, a space station or the like, for example, the following apparatuses have been known, as a plant cultivating apparatus which is necessary for the self-supply of the plant mentioned above, or an experimental device utilizing the plant.

In Japanese Unexamined Patent Publication No. 62-29915, there is described a plant cultivating apparatus in a space ship which has a conical tube body, a plurality of pallet guides extending in an axial direction on an inner wall of the tube body, a light source device arranged so as to be extended in the axial direction within the tube body, and a part for rotating the tube body, mounts a pallet for breeding a plant on the pallet guides from a side of a small diameter portion within the tube body, and moves the pallet to a side of a large diameter portion of the tube body along the pallet guides in accordance with a rotation of the tube body.

In Japanese Unexamined Patent Publication No. 7-289104, there is described a rotary hydroponic cultivating apparatus comprising a cylindrical base body, a plant carrier holding part provided in an inner side of the cylindrical base body in a protruding manner, a drive source for rotating the cylindrical base body, and a breeding water supply pipe for supplying a breeding water to the cylindrical base body.

Further, in Japanese Unexamined Patent Publication No. 2002-154500, there is described a micro gravity rotating apparatus rotating in an outer space, which comprises a rotary shaft placed in a center portion of a casing and in which any one of a line of both end portion and one end portion is rotatably supported to a side of the casing via a bearing and one end is connected to a motor, an arm having one end mounted to the rotary shaft and extending radially, and an optional number of boxes respectively mounted to a leading end of the arm, applying a weight and housing the plant. The bearing is an electromagnetic bearing having a coil which is close to a periphery of the rotary shaft and is mounted to a side of the casing The micro gravity rotating apparatus is also provided with a plurality of vibration sensors arranged close to the periphery of the rotary shaft in the vicinity of the coil and mounted to a side of the casing, and a controller taking signals from a plurality of vibration sensors, detecting a vibration on the basis of a displacement of the rotary shaft, controlling an exciting current of the coil and controlling so as to absorb the vibration.

All of the plant cultivating apparatuses mentioned above relate to a technique of preventing the water and the plant from flying in all directions by being provided with the rotating part so as to generate a centrifugal force.

However, in order to rotate a cultivating room for cultivating the plant, a great power source is required, there is generated a problem in securing the power and a place for installing the power source, and this method is not realistic. Further, since the centrifugal force is generated, it is not possible to expect an effect of product class improvement in the weightless environment.

As the plant cultivating apparatus which does not require a rotating part, there has been known a plant cultivating apparatus described in Japanese Examined Patent Publication No. 7-63275. In Japanese Examined Patent Publication No. 7-63275, there is described a plant cultivating apparatus comprising an artificial light source, a cultivating floor facing to the artificial light source and having a water holding property, a gas circulating device for circulating an oxygen and a carbon dioxide gas between the plants cultivated on the cultivating floor and the animals, and a supplying part for supplying moisture and a nutrient element to the plants. In the artificial light source, an effective light quantum density in photosynthesis of the light irradiating to the plants cultivated on the cultivating floor is equal to or more than a value by which a direction of growth is fixed to a direction toward the artificial light source even in the case of the plant which is placed in the weightless state:

As the plant cultivating apparatus mentioned above, it is possible to structure the apparatus compact in comparison with that having the rotating part, by not using the rotating part. Further, since the rotating part is not provided, the micro gravity environment can be maintained as it is. Accordingly, it is expected that an unexpected effect can be obtained, for example, in view of the product class improvement of the plant or the like. However, the following problems exist.

The plant cultivating apparatus is used only for cultivating the plants, can not be used for the other usage, thereby resulting in poor general-purpose property.

Further, since this apparatus is the cultivating apparatus using the hydroponic cultivation and the gel, it is necessary to isolate in order to control the concentration of the breeding liquid and prevent the microbial contamination and the like, and there is a problem that a great installing place and a great cost are required. Further, since the cultivating apparatus uses the hydroponic cultivation and the gel and can not use the soil, it is impossible to grow the plants under the same environmental condition as that of the earth except the gravity.

Further, in a germination test of wheat carried out in the "Meal", it was reported that all of sprouting 300 ears were sterile. The reason thereof is pointed out that an ethylene gas stored within a cabin by a high concentration is caused (Journal of Gravitational Physiology, Vol. 7(2), pp 5-8, 2000).

In the plant cultivation under the closed environment such as the space station, it is a great problem that a harmful gas such as the ethylene or the like is accumulated.

SUMMARY OF THE INVENTION

The present invention is made in order to solve the conventional problems, and an object thereof is to provide a micro gravity environmental control apparatus, a plant cultivating apparatus, an animal raising apparatus, a micro gravity environmental control method, a plant cultivating method and an animal raising method, with high versatility, capable of cultivating a plant and raising an animal by using soil and also capable of preventing a harmful gas from being accumulated at a high concentration under a micro gravity environment or a weightless environment, without requiring a large power source and a wide installing place.

DESCRIPTION OF THE PREFERRED EMBODIMENTS

Figure 1:
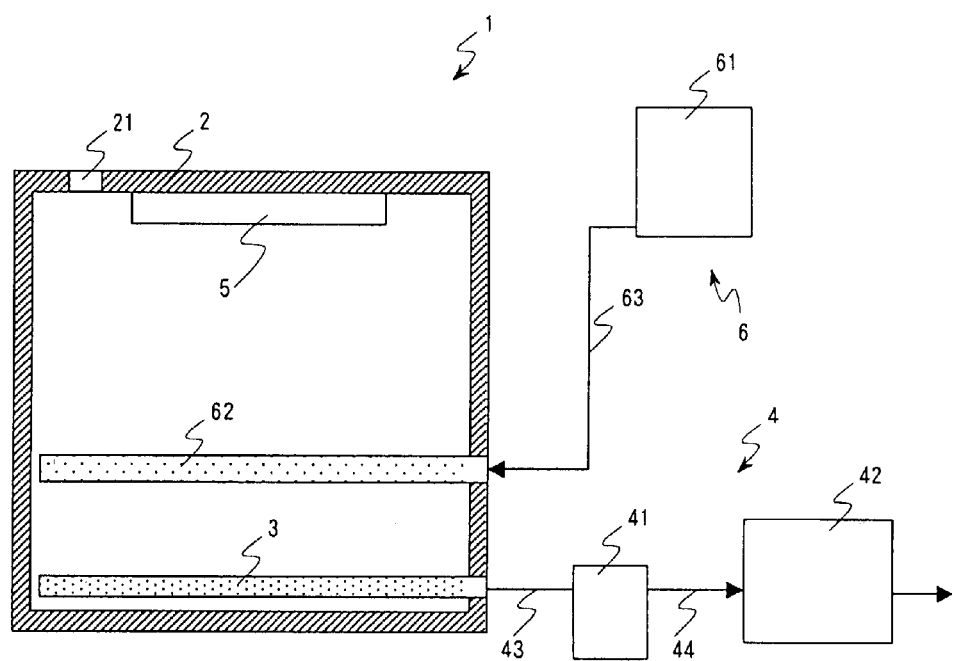
FIG. 1 is a block diagram schematically showing a micro gravity environmental control apparatus according to the present invention, in which a cross section of a chamber is shown.

A description will be specifically given of a micro gravity environmental control apparatus according to the present invention with reference to the drawings. FIG. 1 is a schematic view showing an outline of a micro gravity environmental control apparatus according to the present invention.

A micro gravity environmental control apparatus 1 according to the present invention comprises a chamber 2 provided with an air supply hole 21, and an air suction pipe 3 arranged in the vicinity of a lower end portion within the chamber 2. By employing the structure mentioned above, it is possible to control without making materials housed within the chamber 2 flown in all directions under a micro gravity environment such as in a space ship, a space station and the like without requiring a great power source and a wide installing place. Further, it is possible to house the soil or the like within the chamber 2 so as to cultivate a plant and raise an animal, so that it is possible to breed the plant and the animal under approximately the same environment as that on the earth except the gravity.

The housed materials which are controlled in a predetermined state without flying in all direction under the micro gravity environment are housed in the chamber 2. The materials housed within the chamber 2 are not particularly limited.

A shape aspect of the chamber 2 is not particularly limited, and examples thereof may include a cubic shape, a rectangular parallelepiped shape, a cylindrical shape and the like. However, the shape is not particularly limited as far as the housed materials can be housed within the chamber 2, and all the other shapes may be employed. Further, a material of the chamber is not particularly limited, and examples thereof may include a synthetic resin such as a glass, an acrylic resin and the like.

Further, in the chamber 2, the air supply hole 21 is provided on an upper portion of the chamber 2 so that the air can flow into the chamber 2. Further, it is preferable to form at least a side surface of the chamber 2 by a transparent raw material in such a manner as to easily recognize a state within the chamber 2 from an outer side of the chamber 2.

It is noted that, in FIG. 1, the chamber 2 is illustrated as a cross sectional view.

The air suction pipe 3 is arranged in the vicinity of a lower end portion within the chamber 2, and is structured such that the air within the chamber 2 can be circulated with the outside of the chamber 2 through the air suction pipe 3. Further, an air sucking part 4 is communicated and connected with the air suction pipe 3, and is structured such that the air within the chamber 2 is sucked to the outside of the chamber 2 through the air suction pipe 3. Accordingly, an air flow downwardly directed within the chamber in a vertical direction is formed within the chamber 2. Since the air flow downwardly directed within the chamber in the vertical direction is formed within the chamber 2, the materials housed within the chamber 2 are controlled so as to be positioned below the chamber 2, and it is possible to prevent the housed materials from flying in all directions even under the micro gravity environment.

The air suction pipe 3 is not particularly limited as far as the air within the chamber 2 can pass through to the outside of the chamber 2, and examples of the air suction pipe 3 may include a porous synthetic resin pipe having a large number of holes formed on a surface thereof.

In the case of using the air suction pipe 3 having a large number of holes formed on the surface thereof, a diameter of the holes provided on the surface is not particularly limited as far as the diameter of the holes has a size through which the air can pass. However, in the normal case, since the housed materials are housed within the chamber 2, it is preferable that the diameter has a size through which the housed materials can not substantially pass.

The air suction pipe 3 may be structured such that one pipe is arranged in the vicinity of a lower end portion of the chamber 2, or a plurality of pipes are arranged at an approximately uniform interval.

Further, the air sucking part 4 illustrated in the figure is provided with an air suction device 42 which sucks the air within the chamber 2, and a liquid separating unit 41 which can separate the air sucked from the inside of the chamber 2 and the liquid such as the water or the like sucked from the inside of the chamber 2. The air suction pipe 3 and the liquid separating unit 41 are communicated and connected by a connection pipe 43, and the liquid separating unit 41 and the air suction device 42 are communicated and connected by a connection pipe 44.

In the case where the moisture is housed within the chamber 2, the moisture is sucked out of the chamber 2 together with the air, by the air suction device 42. However, since the liquid separating unit 41 is provided, it is possible to separate and recover the moisture sucked together with the air and the moisture contained in the air.

It is noted that a suction amount of the air sucked by the air sucking part 4 can be appropriately and optionally set in correspondence to the housed materials which are housed within the chamber 2. More specifically, under the micro gravity environment or the weightless environment, it is possible to appropriately and optionally set to the suction amount by which the housed materials can be controlled so as to be positioned at the lower portion within the chamber.

Further, the micro gravity environmental control apparatus 1 according to the present invention can comprise an air purification device (not shown) which can purify the air sucked from the inside of the chamber 2. Since it is possible to purify the air sucked from the inside of the chamber 2, it is possible to discharge the air sucked from the inside of the chamber 2 into, for example, the space ship and the space station as it is.

Further, in the micro gravity environmental control apparatus 1 according to the present invention, it is possible to place a light source 5 in such a manner as to illuminate the inside of the chamber 2. Examples of the used light source may include an incandescent light, an LED (near infrared, red, blue and white) and the like; however, the light source is not particularly limited thereto.

Further, the micro gravity environmental control apparatus 1 according to the present invention can comprise a liquid supplying part 6 for supplying the liquid such as water or the like into the chamber 2.

The liquid supplying part 6 illustrated in the figure includes a liquid supply device 61 for housing the liquid and supplying a predetermined amount of liquid, and a pipe 62 arranged within the chamber 2 and used for dispersing the supplied liquid into the chamber 2. The liquid supply device 61 and the pipe 62 are communicated and connected by a connection pipe 63. Further, a large number of holes having a size by which the supplied liquid can pass through the holes are provided on a surface of the pipe 62, whereby it is possible to supply the liquid into the chamber 2 in a dispersing manner.

In this case, the structure may be made such that the liquid separated and recovered by the liquid separating unit 41 is supplied to the liquid supply device 61, thereby again supplying the separated and recovered moisture to the soil. In accordance with the structure mentioned above, it is possible to circulate and reuse the moisture.

In the micro gravity environmental control apparatus 1 according to the present invention, the air flow downwardly directed within the chamber 2 in the vertical direction is generated by sucking the air within the chamber 2 out of the chamber 2 through the air suction pipe 3 by means of the air sucking part 4. Accordingly, even in the case where the apparatus according to the present invention is placed under the micro gravity environment or the weightless environment, it is possible to prevent the materials housed within the chamber 2 from flying in all directions and it is possible to control the housed materials.

An intended use of the micro gravity environmental control apparatus 1 according to the present invention as described above is not particularly limited, and the micro gravity environmental control apparatus can be used, for example, as the plant cultivating apparatus and the animal raising apparatus.

Next, a description will be specifically given of a case where the micro gravity environmental control apparatus according to the present invention is utilized as the plant cultivating apparatus, with reference to the drawings.

Figure 2:
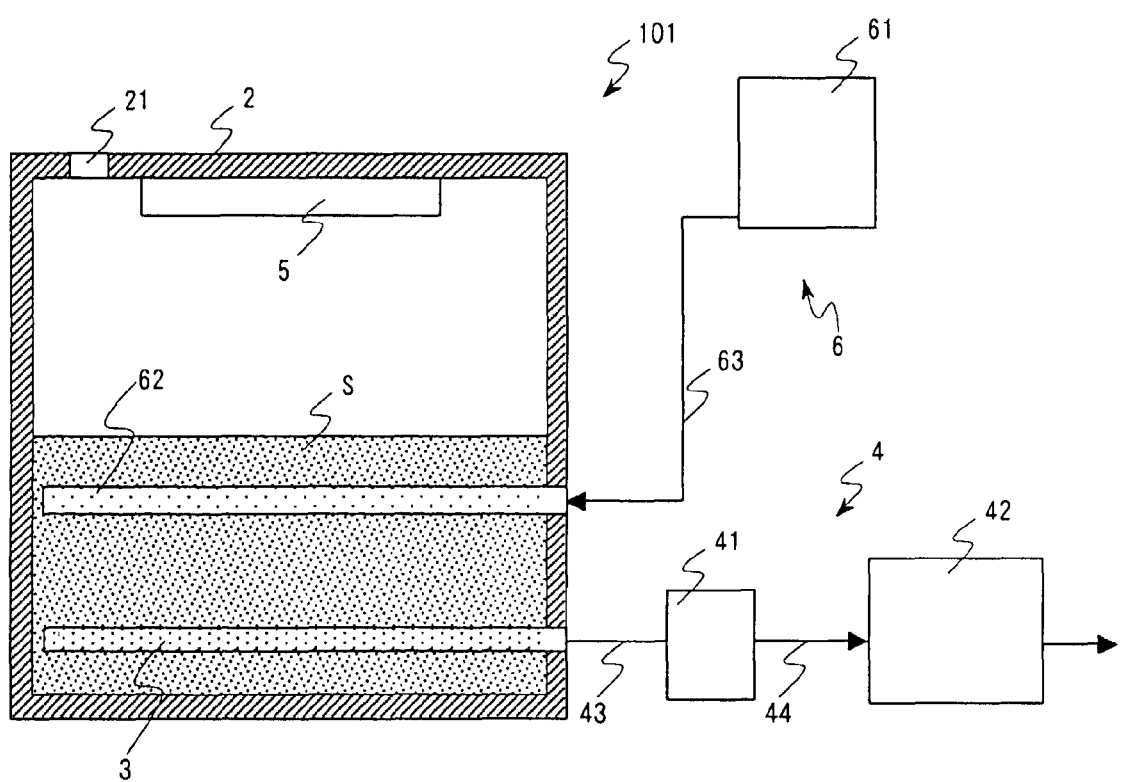
FIG. 2 is a block diagram schematically showing a plant culturing apparatus according to the present invention, in which a cross section of a chamber is shown.

FIG. 2 is a schematic view showing an outline of a plant cultivating apparatus 101 according to the present invention. A structure of the plant cultivating apparatus 101 according to the present invention can employ the structure of the micro gravity environmental control apparatus 1 mentioned above, and comprises the chamber 2 provided with the air supply hole 21, and the air suction pipe 3 arranged in the vicinity of the lower end portion of the chamber 2. Further, the soil S and the like which are required for cultivating the plant are housed within the chamber 2, and the chamber 2 is utilized as a cultivating room. It is noted that it is sufficient that the air supply hole 21 is provided so as to be positioned above the surface of the soil S, however, it is preferable that the air supply hole 21 is provided on an upper surface of the chamber 2.

Further, the air in the soil S is sucked out of the chamber 2 through the air suction pipe 3 by means of the air sucking part 4, and the air flow downwardly directed within the chamber 2 in the vertical direction is formed. Accordingly, the plant and the soil housed within the chamber 2 are controlled so as to be positioned below the chamber 2.

Figure 3:
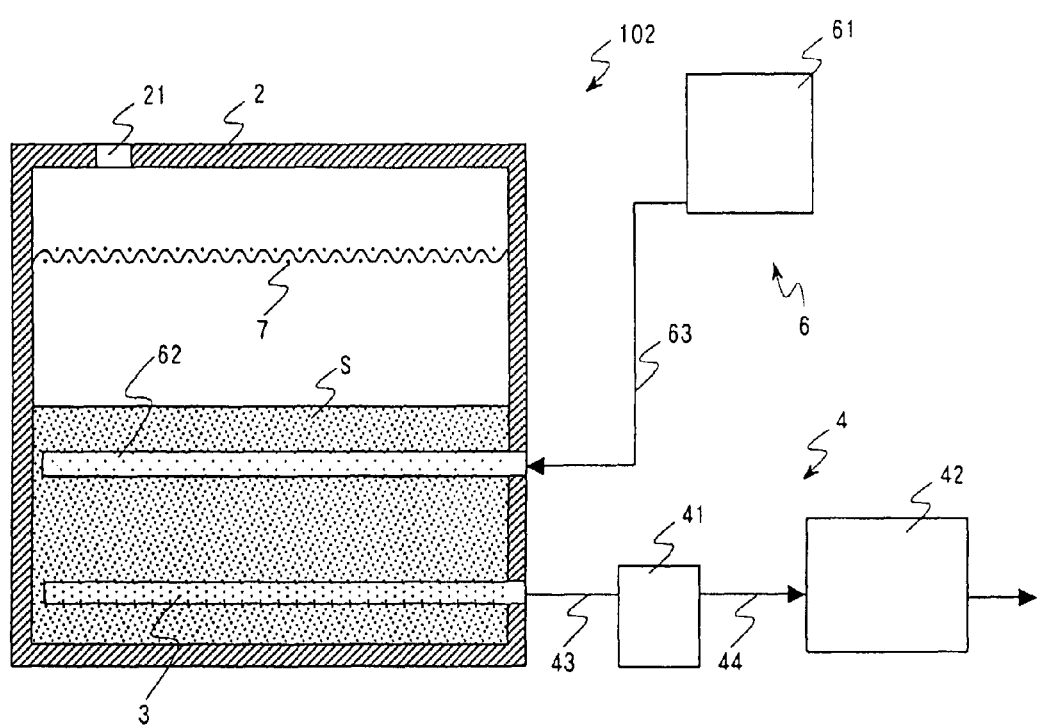
FIG. 3 is a block diagram schematically showing an animal raising apparatus according to the present invention, in which a cross section of a chamber is shown.

It is noted that, in FIG. 3, the chamber 2 is illustrated by a cross sectional view.

The soil S and the like which are required for cultivating the plant are housed within the chamber 2. The housed soil is housed so as to form such a layer that an air gap becomes gradually larger from a surface layer toward a lower layer, such as an order of the soil of fine grains, the soil of middle level of grains, fibrous materials such as moss, rock wool or the like, and stones from the surface layer, whereby it is possible to prevent the air suction pipe 3 from being clogged.

Further, the plant cultivating apparatus 101 according to the present invention, can comprise a liquid supplying part 6. This is because in the case where the soil is housed within the chamber 2, there is a possibility that a flying amount of the soil becomes increased under the micro gravity environment, even in the plant cultivating apparatus 101 according to the present invention if the soil dries up. It is possible to effectively prevent the soil from flying in all directions by making the soil contain the moisture. Further, the liquid supplying part 6 can be used for the purpose of supplying the moisture required for breeding the plant into the soil.

The illustrated liquid supplying part 6 includes the liquid supply device 61 housing the liquid and supplying a predetermined amount of liquid, and the pipe 62 arranged within the chamber 2 and used for dispersing the supplied liquid into the chamber 2. The liquid supply device 61 and the pipe 62 are communicated and connected by the connection pipe 63. Further, a large number of holes having a size by which the supplied liquid can pass through the holes are provided on a surface of the pipe 62, whereby it is possible to supply the liquid into the chamber 2 in a dispersing manner. Further, the pipe 62 is provided at a position buried into the soil housed within the chamber 2. Accordingly, it is possible to securely supply the moisture to the soil.

It is noted that, in the case of the plant cultivating apparatus 101, it is possible to supply the moisture in which a nutrient element required for breeding the plant is contained.

An amount of air sucked by the air sucking part 4 can be appropriately and optionally set in correspondence to the kind of the soil S or the like housed within the chamber 2 and the kind of the plant to be cultivated. Further, in the case where the flying of the soil S is observed, or in the case where it is expected that the flying of the soil S is generated at a time of harvesting the plant, it is possible to increase the amount of the sucked air.

Further, the plant cultivating apparatus 101 according to the present invention preferably comprises a liquid recovery device 41 for separating and recovering the moisture from the air sucked by the air sucking part 4. Since the liquid recovery device 41 is provided, it is possible to separate and recover the moisture sucked together with the air by the air sucking part 4 and the moisture contained in the sucked air. The structure is made such that the recovered moisture is supplied to the liquid supply device 61, whereby it is possible to circulate and reuse the moisture.

Even if the air flow downwardly directed within the chamber in the vertical direction is generated within the chamber 2, there is a case where the fine soil S flies in all directions at a time of harvesting the plant and in the case where the vibration is generated. In order to stop the flying soil S within a predetermined range, a flying prevention member (not shown) can be provided. A large number of holes having a size by which the air can pass through the holes and the housed materials can not substantially pass through the holes are provided in the flying prevention member. A place for installing the flying prevention member is not particularly limited; however, may cover all the surface of the soil with being in contact with the surface layer of the soil, or may be placed in a place which is apart from the surface layer of the soil at a predetermined distance.

In order to cultivate the plant by using the plant cultivating apparatus 101 according to the present invention, the soil is housed within the chamber 2, and the air in the soil S is continuously sucked by the air sucking part 4. The air flow downwardly directed within the chamber 2 in the vertical direction is continuously formed by continuously sucking the air in the soil S. Accordingly, the soil S housed within the chamber 2 is always positioned below the chamber 2, thereby controlling the environment within the chamber 2.

A water content of the soil S housed within the chamber 2 is not particularly limited; however, it is preferable that the water content is adjusted to be equal to or more than 15%, more preferably about 30%. This is because the soil S tends to fly if the water content is less than 15%, and this water content is not preferable. However, in the case where it is necessary to cultivate the plant in an extremely low moisture state for the purpose of breeding a dry resistant product class or the like, it is possible to prevent the soil from flying in all directions by the other manner such as increasing a suction amount of the air.

In the plant cultivating apparatus 101 according to the present invention, since the air flow downwardly directed within the chamber 2 in the vertical direction is formed by the air sucking part 4, the plant, the seed of the plant, the soil, the moisture and the like which are housed within the chamber 2 are controlled so as to be positioned below the chamber 2. Accordingly, under the micro gravity environment, it is possible to cultivate the plant with using the soil, and it is possible to carry out various kinds of experiments using the plant such as the plant cultivation, the breed improvement and the like in the space ship and the space station.

Since the air in the soil is sucked, a fresh air can be always supplied to the root of the plant, whereby it is possible to promote the growth of the plant and it is possible to prevent a disease damage such as a root rot and the like. Further, at a time of sucking the air from the soil, the moisture is simultaneously sucked. In the case where the moisture is excessively supplied to the soil, the excessive moisture can be quickly sucked, it is possible to prevent the disease damage of the plant and also possible to promote the growth of the plant. Further, since it is possible to control the dry of the soil by regulating a temperature of the air and an amount of the sucked air, it is possible to exactly control the moisture of the soil by regulating the amount of the supplied water. Accordingly, it is possible to pick out a new product class, for example, which can be bred even under a dry condition such as a desert or the like.

Further, since the air passing through the soil contains a water vapor under an approximately saturated state, a distilled water can be recovered by condensing the air. The recovered water can be circulated and reused by again supplying the recovered water to the soil.

Since the air sucked from the outside of the chamber into the chamber passes through the soil, and is again discharged to the outside of the chamber, dusts, grimes and the like contained in the air are filtrated by the soil, and stinky components contained in the air are resolved on the basis of an effect of the soil so as to be made odor free. Accordingly, the harmful gas is not accumulated in the air at a high concentration.

It is noted that the plant cultivating apparatus 101 according to the present invention described above can be preferably used under the micro gravity environment; however, as a matter of course, it can be used on the earth.

Further, structures other than those mentioned above are the same as that of the micro gravity environmental control apparatus mentioned above, and a description thereof will not be therefore repeated.

Next, a description will be specifically given of a case where the micro gravity environmental control apparatus according to the present invention is used as an animal raising apparatus, with reference to the drawings.

FIG. 3 is a schematic view showing an outline of an animal raising apparatus 102 according to the present invention. A structure of the animal raising apparatus 102 according to the present invention can employ the structure of the micro gravity environmental control apparatus 1 mentioned above, and comprises the chamber 2 provided with the air supply hole 21, and the air suction pipe 3 arranged in the vicinity of the lower end portion of the chamber 2. Further, the soil or sawdust, straw and like (hereinafter, simply referred to as soil and the like S) which are required for raising the animal are housed within the chamber, and the chamber 2 is utilized as a raising room. It is noted that it is sufficient that the air supply hole 21 is provided so as to be positioned above the surface of the soil and the like S; however, it is preferable that the air supply hole 21 is provided on an upper surface of the chamber 2.

Further, the air in the soil and the like S is sucked out of the chamber 2 through the air suction pipe 3 by means of the air sucking part 4, and the air flow downwardly directed within the chamber 2 in the vertical direction is formed. Accordingly, the soil and the like S housed within the chamber 2 are controlled so as to be positioned below the chamber 2.

It is noted that, in FIG. 3, the chamber 2 is shown by a cross sectional view.

Further, the animal raising apparatus 102 according to the present invention can comprise a liquid supplying part 6. This is because in the case where the soil and the like S is housed within the chamber 2, there is a possibility that a flying amount of the soil becomes increased under the micro gravity environment, even in the animal raising apparatus 102 according to the present invention if the soil dries up. It is possible to effectively prevent the soil from flying in all directions by making the soil contain the moisture. Further, the liquid supplying part 6 can be used for the purpose of supplying the moisture to the animal to be raised.

The illustrated liquid supplying part 6 includes the liquid supply device 61 for housing the liquid and supplying a predetermined amount of liquid, and the pipe 62 arranged within the chamber 2 and used for dispersing the supplied liquid into the chamber 2. The liquid supply device 61 and the pipe 62 are communicated and connected by the connection pipe 63. Further, a large number of holes having a size by which the supplied liquid can pass through the holes are provided on a surface of the pipe 62, whereby it is possible to supply the liquid into the chamber 2 in a dispersing manner. Further, the pipe 62 is provided at a position buried into the soil housed within the chamber 2. Accordingly, it is possible to securely supply the moisture to the soil.

An amount of air sucked from the chamber 2 by the air sucking part 4 can be appropriately and optionally set in correspondence to the material housed within the chamber 2 and the animal to be raised. Further, it is possible to change the amount of air sucked in correspondence to an activity condition of the animal. For example, since it is considered that an amount of flying soil or the like becomes increased in a period of time when the animal actively moves, it is possible to increase the sucking amount of air. Further, it is possible to reduce the sucking amount of air in a period of time when the motion of the animal becomes calm.

Further, the animal raising apparatus 102 according to the present invention preferably comprises a liquid recovery device 41 for separating and recovering the moisture from the air sucked by the air sucking part 4. Since the liquid recovery device 41 is provided, it is possible to separate and recover the moisture sucked together with the air by the air sucking part 4 and the moisture contained in the sucked air. The structure is made such that the recovered moisture is supplied to the liquid supply device 61, whereby it is possible to circulate and reuse the moisture.

Further, in the case of raising the animal which may violently move around within the chamber 2, the flying amount of the soil and the like is increased, so that there is a possibility that the fine soil can not be controlled only by the air flow downwardly directed within the chamber 2 in the vertical direction. In order to prevent the fine soil from flying in all directions, it is preferable that the flying prevention member 7 is provided. A large number of holes having a size by which the air can pass through the holes and the housed materials can not substantially pass through the holes are provided in the flying prevention member 7. For example, a net or the like can be exemplified.

A place for installing the flying prevention member 7 can be appropriately and optionally changed in correspondence to the animal to be raised. For example, in the case of raising the animal which lives only in the soil, the flying prevention member 7 may be placed so as to be in contact with the surface of the soil. Further, in the case of the animal which lives on the soil, the flying prevention member 7 may be placed so as to have a predetermined distance with respect to the surface of the soil.

In the animal raising apparatus 102 according to the present invention described above, since the air flow downwardly directed within the chamber 2 in the vertical direction is formed, the material housed within the chamber 2 is controlled so as to be positioned below the chamber 2. Accordingly, even when the housed material is placed in the weightless environment or the micro gravity environment such as the space environment, it is possible to prevent the housed material within the chamber 2 from flying in all directions, and it is possible to raise the animal by using the soil and the like.

Further, in the case where the soil is housed within the chamber 2, since the air within the chamber 2 is discharged to the outside of the chamber 2 after passing through the soil, it is possible to remove a bad smell generated by raising the animal.

Further, the animal raising apparatus 102 according to the present invention can create an environment in which only the gravity is considerably small, while keeping a life mode on the earth of the animal to be raised at a certain degree, and it is possible to observe an influence which existence of the gravity purely gives to the animal.

It is noted that the animal raising apparatus 102 according to the present invention can be preferably used under the micro gravity environment; however, as a matter of course, it can be used on the earth.

Further, structures other than those mentioned above are the same as that of the micro gravity environmental control apparatus 1 mentioned above, and a description thereof will not be therefore repeated.

EXAMPLES

A description will be given of the present invention on the basis of the following examples; however, the present invention is not limited thereto.

Test Example 1

Using a structure in which the plant, the soil, the pumice and the moisture are charged into an acrylic vessel (having an inner diameter of 9 cm×9 cm×9 cm) in a combined and sealed manner, a motion of these materials was observed under the micro gravity environment. Further, it was verified whether or not a covering by mesh (having holes of about 7 mm) on the surface of the soil is useful for preventing the soil from flying in all directions.

As a test method, a sample in a test section described in Table 1 was prepared, a flight experiment (a parabolic flight; a micro gravity environment is formed for a short time at a time when an airplane flies along a parabolic orbit by an acceleration 0) was carried out five times, thereby generating a micro gravity state for 20 seconds about more than 10 times per one flight. After photographing the motion of the acrylic vessel during the experiment by a video camera, a visual analysis was carried out.

As the soil, a commercially available leaf soil and a culture soil containing a reddish soil having a grain size about 2 mm were used.

Further, in the test section including the plant, there was prepared a material in which seeds of lettuce are seeded and cultivated in the soil supplied with about 5 cm thickness one month before the experiment. Results are shown in Table 1.

TABLE 1

|  | Test section 1 | Test section 2 | Test section 3 | Test section 4 | Test section 5 | Test section 6 |
|---|---|---|---|---|---|---|
| Enclosed matters | Pumice Culture soil Plant | Pumice Culture soil Plant | Pumice Culture soil | Pumice Culture soil | Culture soil | Culture soil |
| Mesh coating | Yes | No | Yes | Yes | No | No |
| Water content in soil | 31% | 35% | 57% | 0% | 49% | 31% |
| Soil flying | No | No | No | Yes | No | No |

As the result shown in Table 1, the flying was hardly observed on the surface of the soil on which the plant grows even under the micro gravity. Further, in the experiment only by the soil, it was found that a whole of the soil became stable if the soil was wet at a water content of equal to or more than 30%. Further, in the dry soil, the grains floated up even by a slight gravity change under the micro gravity, and the small grains flown in all directions from the gap of the mesh even when the surface of the soil is coated by the mesh.

Test Example 2

Figure 4:
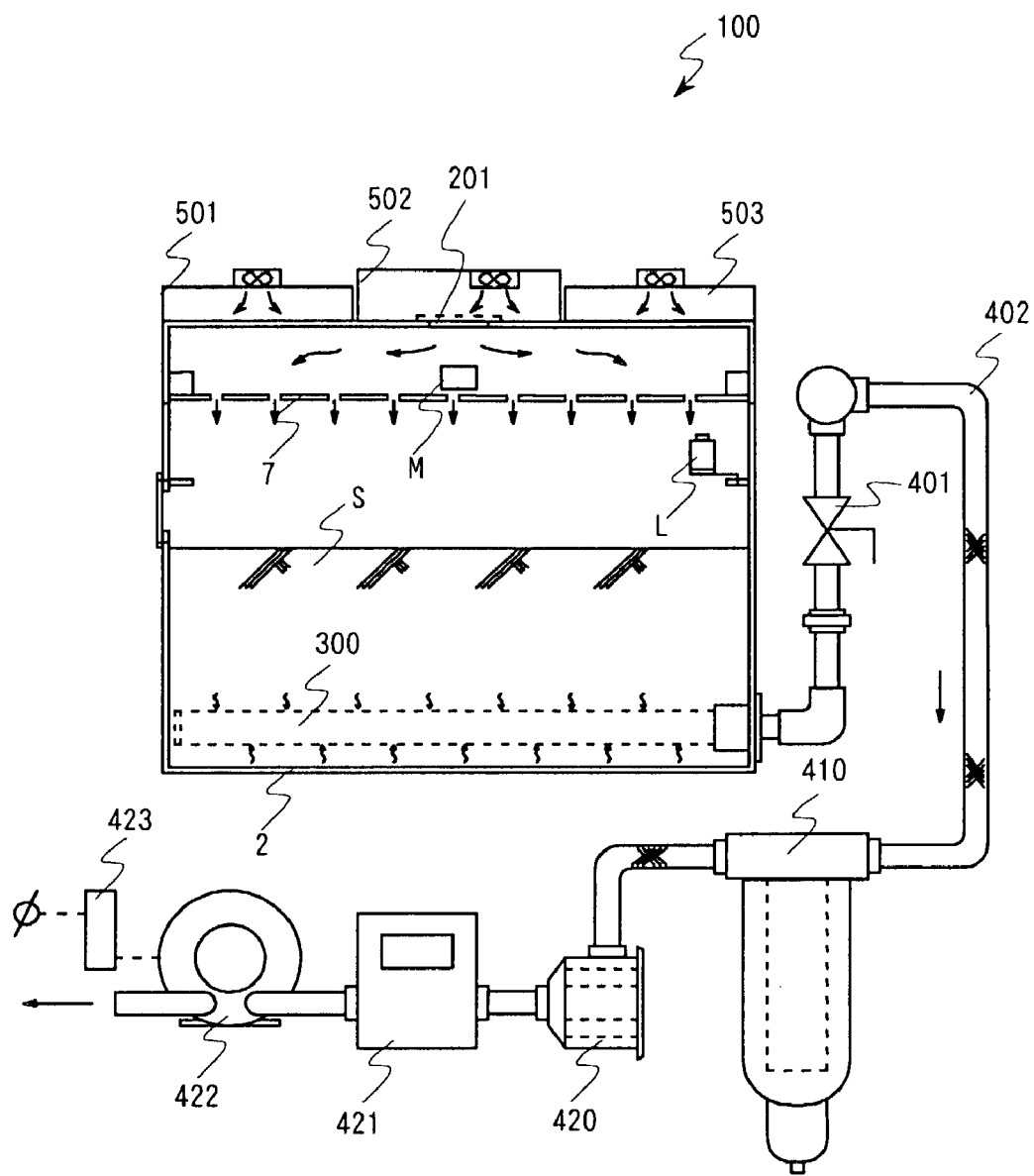
FIG. 4 is a schematic view showing an outline of an experimental device used in Test Examples 1 and 3.

First, an experimental device 100 according to an example shown in FIG. 4 was prepared. The experimental device 100 shown in FIG. 4 was structured such that a cold cathode tube light source 501, a halogen lamp 502 and an LED 503 were placed as the light source on an upper portion of the acrylic resin cultivation tank (having an inner diameter 389 cm×288 cm×169 cm) 2 provided with an air filter 201 at an upper end portion. A mesh 7 was extended all along the surface of the above portion within the cultivation tank 2. Further, a minus ion generator M was placed in the vicinity of the mesh 7.

A porous tube 300 was arranged in a lower end portion of the cultivation tank 2, one end of the porous tube 300 was communicated and connected with a drain separator 410 via a ball valve 401 and a suction tube 402, and a blower 422 was communicated and connected with the drain separator 410 via an air purification device 420 air flow downwardly directed within the cultivation tank 2 in the vertical direction (an arrow shows a flow of the air) was formed by sucking the air within the cultivation tank 2 from the lower end portion of the cultivation tank 2 by a blower 420 out of the cultivation tank 2 through the porous tube 300. An amount of light was measured by a light sensor L placed within the cultivation tank 2, and an amount of the sucked air was measured by a mass flow meter 421 placed between the air purification device 420 and the blower 422.

The culture soil is charged on the pumice, the bog moss and the coconut fiber, within the cultivation tank 2 from the lower end portion of the cultivation tank 2. Twenty seeds of each of chive, spinach, tact, qing-geng-cai, sunny lettuce, basil, barilla, chouhona, tsukena, mustard, cherry tomato, moroheiya, strawberry, marjoram, sage, celery, caraway and oregano were seeded 15 days before starting the experiment, and were cultivated within the room at 25° C. by using the red LED 503 and the cold cathode tube light source 501. In a state where the plant grew thickly, the flying experiment (the parabolic flight) was carried out.

The suction amount of the air from the soil S was changed by an inverter 423 during the flying experiment within a range between 50 and 120 L/min. The parabolic flight was carried out five times, and the micro gravity state for about 20 seconds was generated about more than 10 times per one flight. The motion of the experimental device 100 during the experiment was recorded by a video camera, and thereafter the visual analysis was carried out.

As a result of the experiment, it was reserved that the soil did not fly in all directions under the micro gravity environment by sucking the air in the soil.

Figure 5:
FIG. 5 is a photograph showing a state within a cultivating tank photographed in Test Example 2, in which a state where a soil lump flown up by −G is balanced on the basis of suction (inside of a circle).

Further, just before carrying out the parabolic flight, an environment of minus G (a state where the gravity is applied upward) is formed; however, there was reserved the state where the soil lump peeled from the surface of the soil due to the minus G was controlled without flying in all directions, even under this environment as shown in FIG. 5.

Therefore, the device according to the present invention can securely prevent the soil from flying in all directions, even in the case where the soil is flown up on the basis of the motion of the raised animal and the case where the soil is flown up on the basis of the harvesting operation of the plant.

Test Example 3

The following test was carried out by using the same device as that of Test Example 2 mentioned above.

The soil was charged within the device mentioned above in the same manner as Test Example 2, and changarian hamster and drosophila were put therein. The sucking amount of the air from the soil was set to a range between 50 and 120 L/min, and was changed in each case. The parabolic flight was carried out twice, and the micro gravity state for about 20 seconds was generated about more than 10 times per one flight. The motion of the experimental device during the experiment was recorded by the video camera, and thereafter the visual analysis was carried out.

As a result of the test, the drosophila did not fly at all under the micro gravity environment. The hamster broke a soil aggregate structure so as to get under the soil. When the soil became dry and in a sand shape, the soil was easily fly in all directions. However, the soil did not leak from the mesh.

Accordingly, in the case of raising the animal, in order to prevent the housed material from flying in all direction, it is desired to place the porous net.

As specifically described above, in the micro gravity environmental control apparatus and control method according to the present invention, since the air flow downwardly directed within the chamber in the vertical direction is formed by the air sucking part, it is possible to prevent the material housed within the chamber from flying in all directions, even under the micro gravity environment.

In the plant cultivating apparatus and the plant cultivating method according to the present invention, it is possible to control the plant and the soil, the water and the like required for cultivating the plant which are housed within the chamber in such a manner as to be positioned below the chamber, by forming the air flow downwardly directed within the chamber in the vertical direction, by means of the air sucking part. Accordingly, it is possible to cultivate the plant with using the soil, under the micro gravity environment.

Further, since the air is supplied to the soil by sucking the air in the soil, it is possible to activate the activity of the aerobic bacteria so as to suppress the activity of the anaerobic bacteria leading to the bad smell. Further, since the air is supplied to the soil, it is possible to suppress the generation of the disease damage such as the root rot or the like which tends to be caused by the short of oxygen. Further, it is possible to control the temperature of the soil and the concentration of the oxygen within the soil on the basis of the amount of the sucked air, the temperature of the air and the humidity of the air, whereby it is possible to control the growth of the plant and the breeding of the soil microbe.

Further, it is possible to simultaneously suck the extra moisture in the soil by sucking the air from the soil, whereby it is possible to strictly control the amount of the water content in the soil. The moisture sucked from the soil can be circulated and reused by separating from the air and supplying the moisture to the soil.

Further, since the air within the chamber is exhausted through the soil, it is possible to remove the harmful gas, the dusts and the grime contained in the air at a time of passing through the soil.

In the animal raising apparatus and the animal raising method according to the present invention, it is possible to control the animal raised within the chamber and the soil and the like required for raising in such a manner as to be positioned below the chamber, by forming the air flow downwardly directed within the chamber in the vertical direction, by means of the air sucking part. Accordingly, it is possible to raise the animal under the micro gravity environment.

Further, in the animal raising, the treatment of the body wastes causes a problem; however, the body wastes are treated by the microbe in the soil. Further, since the bad smell is adsorbed in the soil, the smell is hardly generated.

In the breeding method according to the present invention, since it is possible to breed with using the soil under the micro gravity environment, it is possible to breed under the approximately same condition as that of the earth except the gravity environment, and it is possible to utilize for improving the breed and search the generic factor.

What is claimed is:

1. A plant cultivating apparatus used under micro gravity environment comprising:
   a chamber for housing soil consisting of grains and cultivating a plant;
   an air suction pipe arranged in the vicinity of a lower end portion within the chamber;
   air sucking means communicated and connected with the air suction pipe and used for sucking the air in said soil within the chamber out of the chamber to prevent said grains of said soil from flying away in said chamber;
   a liquid supplying pipe arranged above the air suction pipe and at a position wholly buried into the soil and used for dispersing liquid into the soil;
   liquid supplying means communicated and connected with the liquid supplying pipe and used for supplying liquid into the liquid supplying pipe;
   wherein size of said grains becomes larger from a surface layer of said soil toward a lower layer so that an air gap gets gradually larger from a surface layer toward a lower layer.

2. A plant cultivating apparatus according to claim 1 further comprising liquid recovering means for separating and recovering moisture from the air sucked out of the chamber.

3. A plant cultivating apparatus according to claim 2 further comprising a light source.

4. A plant cultivating apparatus according to claim 3, wherein plural holes which allow to pass the air therethrough and substantially inhibit soil from passing there through are provided on a surface of the air suction pipe.

5. A plant cultivating apparatus according to claim 2, wherein plural holes which allow to pass the air therethrough and substantially inhibit soil from passing therethrough are provided on a surface of the air suction pipe.

6. A plant cultivating apparatus according to claim 1 further comprising a light source.

7. A plant cultivating apparatus according to claim 6, wherein plural holes which allow to pass the air therethrough and substantially inhibit soil from passing therethrough are provided on a surface of the air suction pipe.

8. A plant cultivating apparatus according to claim 1, wherein plural holes which allow to pass the air therethrough and substantially inhibit soil from passing therethrough are provided on a surface of the air suction pipe.

* * * * *